(12) United States Patent
Mittelberger et al.

(10) Patent No.: US 8,123,657 B2
(45) Date of Patent: Feb. 28, 2012

(54) METHOD FOR THE OPERATION OF A DRIVE TRAIN

(75) Inventors: Christian Mittelberger, Ravensburg (DE); Johannes Kaltenbach, Friedrichshafen (DE); Stefan Blattner, Vogt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 228 days.

(21) Appl. No.: 12/677,150

(22) PCT Filed: Sep. 16, 2008

(86) PCT No.: PCT/EP2008/062274
§ 371 (c)(1),
(2), (4) Date: Mar. 9, 2010

(87) PCT Pub. No.: WO2009/037239
PCT Pub. Date: Mar. 26, 2009

(65) Prior Publication Data
US 2010/0204006 A1 Aug. 12, 2010

(30) Foreign Application Priority Data
Sep. 22, 2007 (DE) .......................... 10 2007 045 365

(51) Int. Cl.
*B60W 10/02* (2006.01)
*B60W 10/06* (2006.01)
*B60W 10/08* (2006.01)

(52) U.S. Cl. .............................. 477/5; 477/176; 477/181

(58) Field of Classification Search .............. 477/5, 167, 477/176, 180, 181
See application file for complete search history.

(56) References Cited

U.S. PATENT DOCUMENTS

| | | | |
|---|---|---|---|
| 6,077,186 A | 6/2000 | Kojima et al. | |
| 6,543,561 B1 | 4/2003 | Pels et al. | |
| 6,997,275 B2 | 2/2006 | Mesiti et al. | |
| 2005/0221947 A1 | 10/2005 | Mesiti et al. | |
| 2007/0056783 A1 | 3/2007 | Joe et al. | |
| 2007/0102211 A1 | 5/2007 | Nozaki et al. | |
| 2007/0114082 A1 | 5/2007 | Nozaki et al. | |
| 2007/0207892 A1* | 9/2007 | Dreibholz et al. | 477/8 |
| 2007/0278022 A1* | 12/2007 | Tanishima | 180/65.2 |
| 2008/0064560 A1* | 3/2008 | Popp et al. | 477/5 |
| 2008/0064561 A1* | 3/2008 | Popp et al. | 477/5 |
| 2008/0195266 A1 | 8/2008 | Le Neindre et al. | |
| 2008/0245332 A1 | 10/2008 | Rimaux et al. | |
| 2009/0124452 A1 | 5/2009 | Fuechtner et al. | |

(Continued)

FOREIGN PATENT DOCUMENTS
DE 198 14 402 A1 10/1999
(Continued)

*Primary Examiner* — Edwin A Young
(74) *Attorney, Agent, or Firm* — Davis & Bujold, P.L.L.C.

(57) ABSTRACT

A method of operating a drive train comprising a hybrid drive with a combustion engine and an electric motor; a transmission positioned between the hybrid drive and the output; and a clutch positioned between the combustion engine and the electric motor. When the electric motor exclusively drives the vehicle, the combustion engine can be started by engaging the clutch. At the time when the electric motor permanently or without traction force interruption is coupled to the output, and the rotational speed of the electric motor is greater than the starting rotational speed of the combustion engine, and a clutch, positioned between the combustion engine and the electric motor, is engagedly and disengagedly controlled so that the clutch is brought into slippage, via partial engagement, to start the combustion engine, and thereafter the clutch is completely disengaged before reaching a synchronous rotational speed between the combustion engine and the electric motor.

10 Claims, 2 Drawing Sheets

U.S. PATENT DOCUMENTS

2010/0056328 A1    3/2010    Schenk et al.

FOREIGN PATENT DOCUMENTS

| DE | 102 60 435 A1 | 7/2004 |
|---|---|---|
| DE | 103 27 306 A1 | 1/2005 |
| DE | 10 2006 048 358 A1 | 4/2008 |
| DE | 10 2006 049 888 A1 | 4/2008 |
| DE | 10 2007 001 424 A1 | 7/2008 |
| EP | 0 922 600 A2 | 6/1999 |
| EP | 1 785 305 A2 | 5/2007 |
| FR | 2 882 697 A1 | 3/2005 |
| WO | 01/56824 A1 | 8/2001 |
| WO | 2004/111441 A1 | 12/2004 |
| WO | 2007/045785 A1 | 4/2007 |
| WO | 2008/049662 A1 | 5/2008 |

\* cited by examiner

METHOD FOR THE OPERATION OF A DRIVE TRAIN

This application is a National Stage completion of PCT/EP2008/062274 filed Sep. 16, 2008, which claims priority from German patent application serial no. 10 2007 045 365.7 filed Sep. 22, 2007.

FIELD OF THE INVENTION

The invention relates to a method for operating a drive train of a motor vehicle comprising at least one transmission and one hybrid drive.

BACKGROUND OF THE INVENTION

The main components of a drive train in a motor vehicle are a drive unit and a transmission. A transmission converts torque and rotational speed, and hereby converts the available pull force of the drive unit. This present invention relates to operation of a drive train which has at least one transmission and one hybrid drive as a drive unit.

A method for operating an automatic transmission and a hybrid drive off a motor vehicle is known through US 2005/0221947 A1 whereby a clutch is positioned, on one hand, between a combustion engine of the hybrid drive and an electric motor of the hybrid drive, and, on the other hand, an additional clutch is positioned between the electric motor and the automatic transmission. At the time when the drive train is driven exclusively by the electric motor of the hybrid drive, the combustion engine of the hybrid drive, in accordance with the state of the art, can be started in such a way that, during execution of an upshift by the automatic transmission of the drive train, the clutch, positioned between the combustion engine of the hybrid drive and the electric motor, becomes engaged. In accordance with US 2005/0221947 A1, the electric motor of the hybrid drive hereby serves to start the combustion engine of the hybrid drive, whereby starting of the combustion engine takes place during the execution of an upshift, thus at interrupting the traction force.

SUMMARY OF THE INVENTION

On this basis, the present invention addresses the problem to create a novel method for operating a drive train comprising a transmission and a hybrid drive.

In accordance with the invention, at the time when the electric motor is permanently or without traction interrupt, respectively, coupled with the output and the rotational speed of the electric motor is greater than the initial rotational speed of the combustion engine, the clutch, positioned between the combustion engine and the electric motor, will be engaged and disengaged in such a way that the clutch is brought into slippage, via partial engagement, to start the combustion engine, whereby thereafter, the clutch, before reaching a synchronous rotational speed between the combustion engine and the electric motor, is thus again completely disengaged.

Through the inventive method, it is also possible to start the combustion engine of the hybrid drive via the electric motor of the hybrid drive when the electric motor is permanently linked with the output of the drive train and when there are no interruptions in the traction, where this might take place through partial engagement of the clutch, positioned between the combustion engine and the electric motor, by guaranteeing a high comfort. Starting of the combustion engine takes place, without a transmission action, by a defined control of the clutch, positioned between the combustion engine and the electric motor of the hybrid drive, without interruption in the traction. By providing a high comfort, the combustion engine of the hybrid drive can be started within a short time period.

In accordance with a first advantageous embodiment of the invention, the time controlled partial engagement of the clutch, positioned between the combustion engine and the electric motor, takes place in such a way that during a first defined time interval, the clutch partially engages up to the point at which the clutch transfers the required torque needed to overcome the breakaway torque of the combustion engine, that thereafter, for a second defined time interval, the partial engagement position of the clutch is maintained constant, followed by a third defined time interval where the clutch again remains disengaged.

In a second advantageous embodiment of the invention, the partial engagement of the clutch, positioned between the combustion engine and the electric motor, is controlled by the rotational speed in such a way that the clutch will be partially engaged up to the point at which the first predefined rotational speed threshold of the combustion engine has been reached, and that thereafter, the partial engagement position of the clutch will be maintained constant up to reaching a second predefined rotational speed threshold, and followed by again completely disengaging the clutch.

BRIEF DESCRIPTION OF THE DRAWINGS

Preferred embodiments of the invention are presented in the dependent claims and the description below. Examples of embodiments of this invention, without being limited to them, are further explained through the drawings. It shows:

DETAILED DESCRIPTION OF THE PREFERRED EMBODIMENTS

Figure 1:
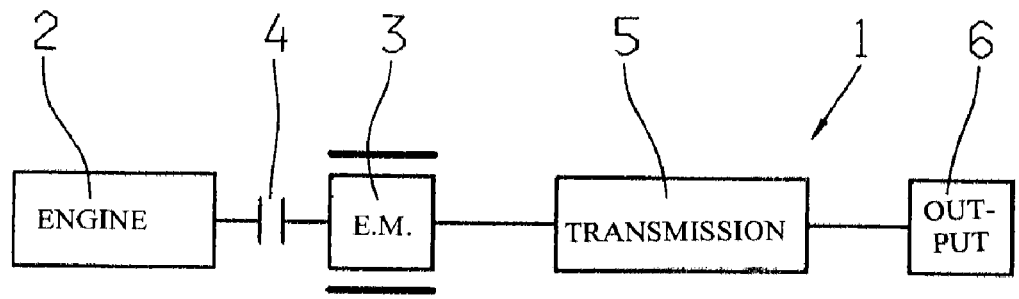
FIG. 1 is a first drive train schematic for a motor vehicle in which the inventive method can be applied.
Figure 2:
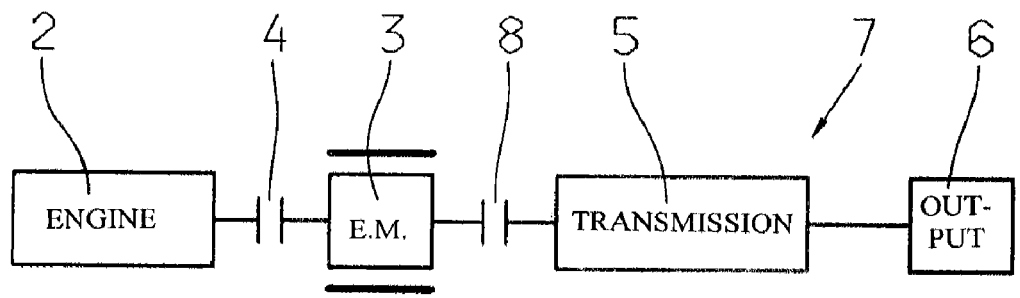
FIG. 2 is a second drive train schematic for a motor vehicle in which the inventive method can be applied.
Figure 3:
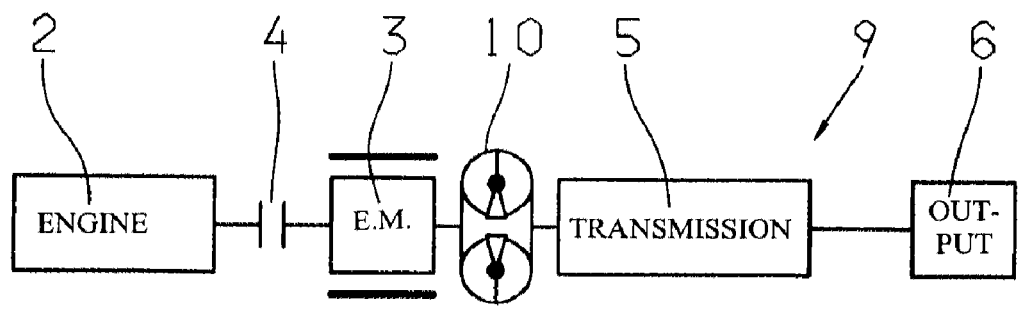
FIG. 3 is a third drive train schematic for a motor vehicle in which the inventive method can be applied.

This present invention relates to a method for operating a drive train for a motor vehicle, comprising at least one transmission and one hybrid drive. A hybrid drive comprises a combustion engine and an electric motor. FIGS. 1 to 3 show exemplarily drive schematics of a motor vehicle in which the inventive method can be used.

FIG. 1 shows a schematic of a drive train 1 of a motor vehicle whereby the drive train 1, in accordance with FIG. 1, comprises a hybrid drive which is formed by a combustion engine 2 and an electric motor 3. Between the combustion engine 2 and the electric motor 3, a clutch 4 is positioned which, at the time when the drive train 1 is driven exclusively by the electric motor 3, is not engaged. Beside the hybrid drive, in accordance with FIG. 1, the drive train 1 also comprises a transmission 5 which transfers the available traction force, which is provided by the hybrid drive, to an output 6 of the drive train, in particular the wheels. In the drive train 7 of FIG. 2, a clutch 8 is positioned between the electric motor 3 of the hybrid drive and the transmission 5. Another schematic of a drive train 9 of a motor vehicle is shown in FIG. 3 whereby the drive train, in FIG. 3, differs from the drive train, in FIG. 2, by the fact that there is no clutch positioned between the electric motor 3 of the hybrid drive and the transmission 5, but instead a conversion device 10.

If a drive train, in accordance with FIG. 1, 2, or 3, is driven exclusively by the electric motor 3 of the hybrid drive with a disengaged clutch 4, under certain operating conditions, it might be required to start the combustion engine 2 of the hybrid drive.

This present invention relates to a method of operating such a drive train in which, at the time when the electric motor 3 exclusively drives the output 6 of the respective drive train and when the combustion engine 2 of the respective drive train stopped, as well as the clutch 4, positioned between the combustion engine 2 and the electric motor 3, is disengaged, to start the combustion engine 2, namely, without coupling of the electric motor 3 with the output 6, thus interrupting the traction.

In accordance with the invention, when the electric motor 3 is permanently coupled, meaning without traction interruption, to the output 6 of the respective drive train, and the rotational speed of the electric motor 3 is greater than a start rotation speed of the combustion engine 2, the combustion engine 2 is started by a controlled engaging and disengaging of the clutch 4, positioned between the combustion engine 2 and the electric motor 3, in such a way that the clutch 4 is brought into slippage by a partial engagement to start the combustion engine 2, followed by fully disengaging the clutch 4, meaning before reaching a synchronous rotational speed between the combustion engine 2 and the electric motor 3. During the entire start phase for the combustion engine 2, the electric motor 3 permanently drives the output 6 of the respective drive train. There is no traction interruption.

The controlled engagement and disengagement of the clutch 4, positioned between the combustion engine 2 and the electric motor 3, first takes place by partial engagement of the clutch 4 for some time, thus causing slippage, through which the transferred torque of the clutch 4 overcomes a breakaway torque of the combustion engine 2, whereby then the partial engagement of the clutch is maintained constant, thus the transferred torque is maintained constant, whereby then the clutch is again completely disengaged.

Figure 4:
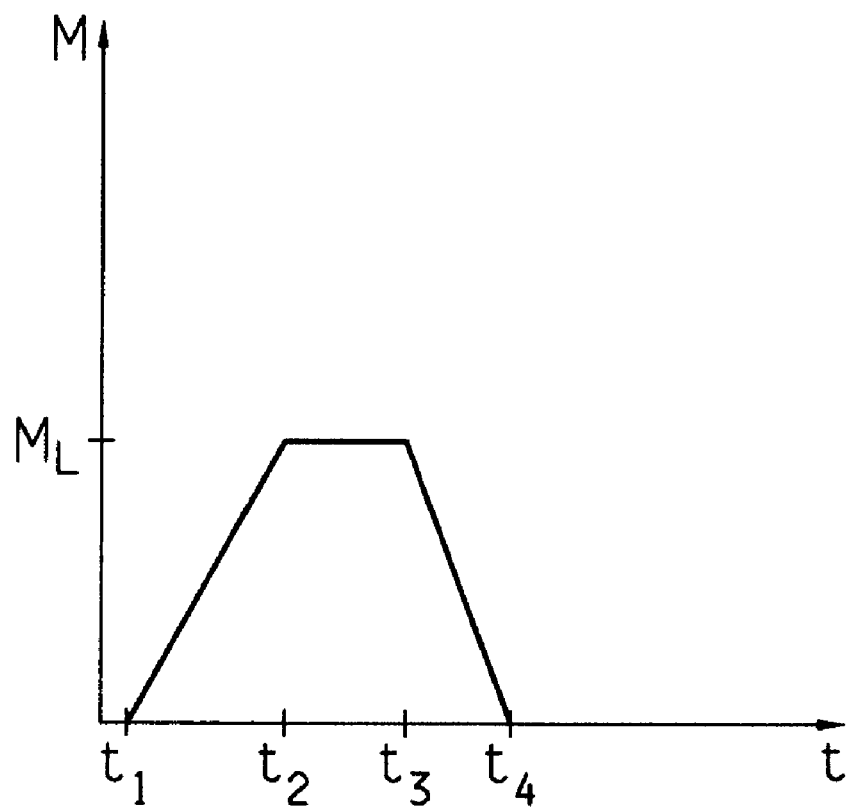
FIG. 4 is a diagram for clarification of the inventive method of a drive train for a motor vehicle.

The details can be seen in FIG. 4 whereby the transferred torque M of the clutch 4 is shown over the time t. At the time $t_1$, the combustion engine 2 is started, in which the clutch 4, beginning at a complete disengaged position and where the clutch does not transfer any torque M, becomes partially engaged whereby the clutch 4, at the time $t_2$, is partially engaged to a point that the clutch transfers a torque $M_L$ at which the breakaway torque of the combustion engine can be overcome. Then, up to the time $t_3$, engagement of the clutch, thus the transferred torque of the clutch, is maintained constant whereby, up to the time $t_4$, the clutch is then again completely disengaged in such a way so that at time $t_4$, the synchronous rotational speed between the combustion engine 2 and the electric motor 3 has not been reached.

In an advantageous embodiment of the invention, the above defined engagement and disengagement of the clutch can be timely controlled whereby the time intervals, between the time markers $t_1$ and $t_2$, $t_2$ and $t_3$, as well as $t_3$ and $t_4$, as well as the engagement position of the clutch 4 in which the clutch transfers the torque $M_L$, are predefined. The parameters for the execution of the inventive method can be adaptively learned whereby these parameters are also, and preferably, dependent on a temperature of the combustion engine 2.

In a second advantageous embodiment of the inventive method, the defined controlled engagement and disengagement of the clutch 4, positioned between the combustion engine 2 and the electric motor 3, takes place through a rotational speed control whereby here the clutch 4 is partially engaged to a point at which a first predefined rotational speed threshold of the combustion engine 2 has been reached, where the breakaway torque of the combustion engine 2 has been overcome.

Once the first predefined rotational speed threshold has been reached, the obtained partial engagement position of the clutch is maintained constant until reaching of a second predefined rotational speed threshold whereby the combustion engine 2, when the second predefined rotational speed has been reached, starts independently or starts rotating, respectively.

Thereafter, the clutch 4 is again completely disengaged in such a way that the clutch 4 is completely disengaged before reaching the synchronous rotational speed between the combustion engine 2 and the electric motor 3. Thus, the time markers $t_1$ to $t_4$ of the diagram in FIG. 4 are not firmly predefined in this version but instead are dependent on the rotational speed thresholds of the combustion engine 2.

During the controlled partial engagement and the following disengagement of the clutch 4, positioned between the combustion engine 2 and the electric motor 3, the available drive torque, provided by the electric motor 3 and which is permanently driving the output, is maintained constant. Alternatively, it is possible, however, that the drive torque provided by the electric motor 3 is altered, during the partial engagement, to increase the comfort and a following disengagement of the clutch 4, to compensate the torque which was transferred by the clutch 4 to the combustion engine 2 to provide a nearly constant drive torque at the output 6.

Through this inventive method, a combustion engine 2 of a hybrid drive can be started within a short time by means of the electric motor 3 of the drive train, with a guarantee of a high comfort and at the time when the electric motor 3 permanently maintains the traction force to the output 6.

At the beginning of the inventive method, the combustion engine 2 is at stand still, the clutch 4 is disengaged and the electric motor 3 respectively drives the drive train or the output 6. At the end of the inventive method, the combustion engine 2 is running, the clutch 4 is disengaged, and the electric motor 3 permanently drives the output 6 of the respective drive train.

Reference Characters

1 Drive Train
2 Combustion Engine
3 Electric Motor
4 Clutch
5 Transmission
6 Output
7 Drive Train
8 Clutch
9 Drive Train
10 Conversion Device

The invention claimed is:

1. A method of operating a drive train of a motor vehicle whereby the drive train comprises a hybrid drive with a combustion engine and an electric motor,
   a transmission, positioned between the hybrid drive and the output, and
   a clutch, positioned between the combustion engine and the electric motor,
   whereby, when the electric motor exclusively drives the motor vehicle, the combustion engine can be started by engaging the clutch, positioned between the combustion engine and the electric motor,
   further comprising that when the electric motor permanently or without traction force interruption is coupled to the output and a rotational speed of the electric motor is greater than a starting rotational speed of the combustion engine, and the method comprising the steps of:

engaging the clutch, positioned between the combustion engine and the electric motor, in such a way that the clutch is brought to a slippage, via a partial engagement, to start the combustion engine, and thereafter completely disengaging the clutch, meaning before reaching a synchronous rotational speed between the combustion engine and the electric motor.

2. The method according to claim 1, further comprising the step of, during the controlled partial engagement and disengagement of the clutch, positioned between the combustion engine and the electric motor, changing the torque, provided by the electric motor to the output, to compensate the torque which has been transferred by the clutch to the combustion engine to guarantee an approximately constant torque at the output.

3. The method according to claim 1, further comprising the step of first partially engaging the clutch, positioned between the combustion engine and the electric motor, up to a point at which torque which is transferred by the clutch overcomes a breakaway torque of the combustion engine, thereafter maintaining the partial engagement position of the clutch constant, and thereafter fully disengaging the clutch.

4. The method according to claim 1, further comprising the step of having the partial engagement of the clutch, positioned between the combustion engine and the electric motor, take place in a timed control manner.

5. The method according to claim 4, further comprising the step of, during a first predefined time interval, partially engaging the clutch up to the point at which the clutch transfers the required torque needed to overcome the breakaway torque, thereafter, during a second predefined time interval, maintaining the engagement position of the clutch constant, and thereafter, during a third predefined time interval, completely disengaging the clutch.

6. The method according to claim 5, further comprising the step of adaptively learning the time intervals and the partial engagement position.

7. The method according to claim 1, further comprising the step of controlling the rotational speed to facilitate partial engagement of the clutch, positioned between the combustion engine and the electric motor.

8. The method according to claim 7, further comprising the step of partially engaging the clutch, positioned between the combustion engine and the electric motor, up to the point where a first predefined rotational speed threshold of the combustion engine is reached, thereafter maintaining the partial engagement position of the clutch constant until reaching of a second predefined rotational speed threshold of the combustion engine, and thereafter completely disengaging the clutch.

9. The method according to claim 8, further comprising the step of setting the first rotational speed threshold and the second rotational speed threshold lower than the synchronous rotational speed between the combustion engine and the electric motor whereby, when reaching the first rotational speed threshold, the breakaway torque of the combustion engine is overcome and, when reaching the second rotational speed threshold, the combustion engine starts independently.

10. The method according to claim 1, further comprising the step of, during the controlled partial engagement and disengagement of the clutch, positioned between the combustion engine and the electric motor, maintaining the provided drive torque at the output constant.

\* \* \* \* \*